J. W. RENO.
RAISING SUNKEN VESSELS.
APPLICATION FILED FEB. 25, 1920.

1,364,142.

Patented Jan. 4, 1921.
3 SHEETS—SHEET 1.

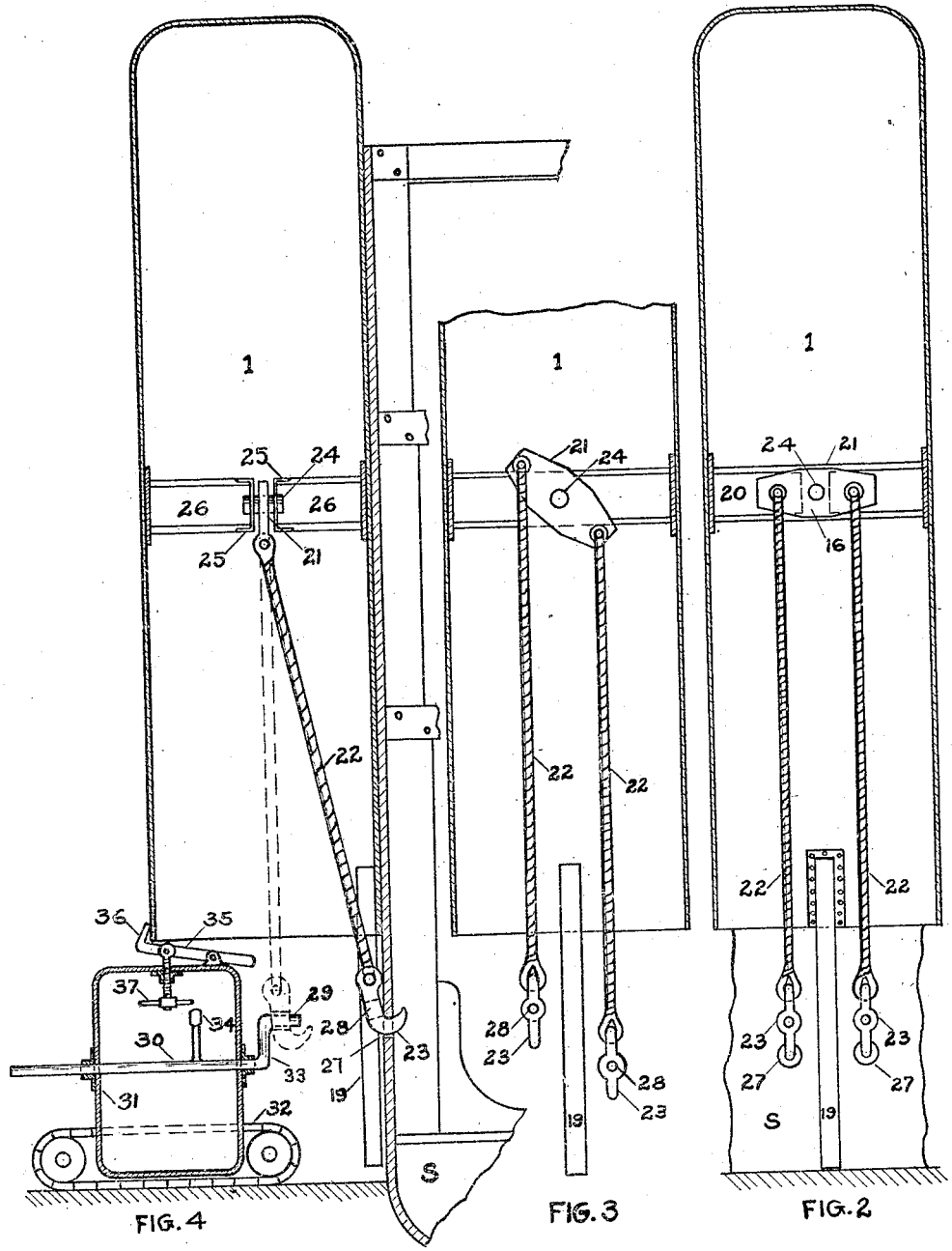

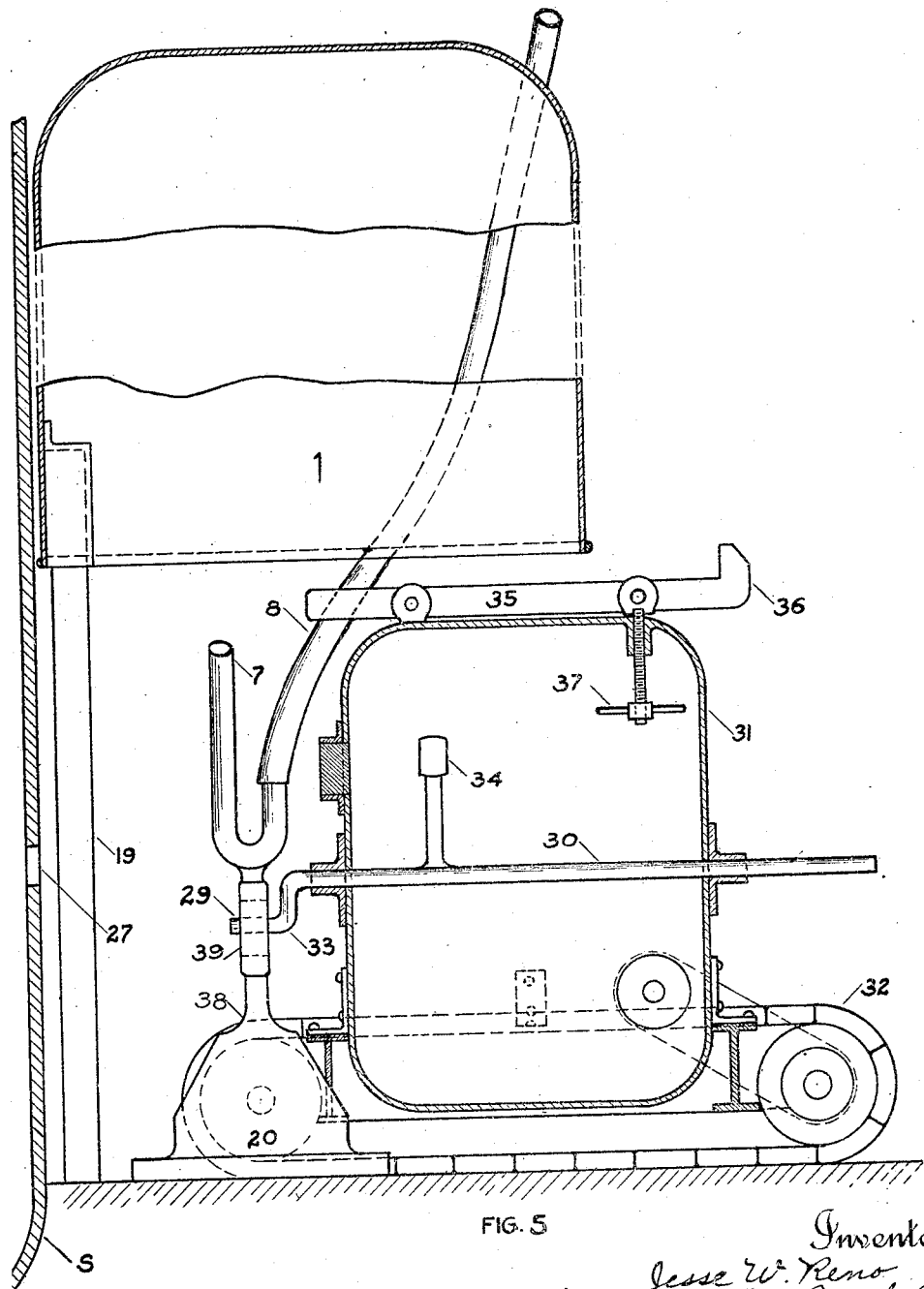

UNITED STATES PATENT OFFICE.

JESSE W. RENO, OF NEW YORK, N. Y.

RAISING SUNKEN VESSELS.

1,364,142.      Specification of Letters Patent.      Patented Jan. 4, 1921.

Application filed February 25, 1920. Serial No. 361,092.

*To all whom it may concern:*

Be it known that I, JESSE W. RENO, a citizen of the United States, residing in New York, in the county of New York and State of New York, have invented a new and useful Improvement in Devices for Raising Sunken Vessels, of which the following is a specification.

My invention relates to the art of vessel raising and has for its purpose to devise a series of means or devices for raising sunken or submerged vessels, some of which devices or means comprise an air tank adapted to receive the sea water and be sunk in the sea, and thereupon be attached to a sunken vessel, and have the water expelled from the tank, thus raising the vessel by buoyant force to the surface of the sea. Further, my invention relates to means and devices in that same art of raising sunken vessels, comprising an air siphon which serves the dual function of a support to let the air tank down in the sea under control and direction, and to discharge air into the air tank to cause it to rise in the sea and raise the sunken vessel. The siphon is supported on a base, and the supporting stem of the siphon has a hole through it, adapted to receive a manipulating rod protruding from a working chamber on a mobile tractor on the bottom of the sea, by which rod a siphon can be picked up and moved from place to place on the bottom of the sea by means of the mobile tractor. My invention further comprises a working chamber, a power-driven reel or drum carried on the tractor, and a manipulating rod protruding from the chamber adapted to be manipulated by the operator in the working chamber to engage hooks attached to the air tank to direct the hook to engage in a hole formed in the side of the sunken vessel in order to attach the air tank to the vessel to raise it by buoyant force; further, my invention involves the use of an equalizer and two cables between the hooks and the air tank to enable the buoyant lifting strains of the air tank on the sunken vessel to be evenly distributed. My invention also involves means comprising what I may term, a leg or post, one end of which is adapted to be fixed to the bottom of the air tank and project below the bottom thereof a predetermined distance, its free end to rest on the bottom of the sea in order to support the air tank at an elevation to allow overhead room for the mobile tractor.

My invention also includes a working chamber carried thereon to pass under the bottom of the air tank, adjustable means on the top of the working chamber to engage the bottom of the air tank to enable the operator of the working chamber to cause the said adjustable means to engage the bottom of the air tank to lift the tank sufficiently to allow the leg or post to clear the bottom of the sea, and the mobile working chamber to cause the air tank to be moved to the site of the sunken vessel in the proper relation and position to enable the operator of the manipulating rod mentioned above to engage the hooks on the end of the lifting cables connected to the air tank, to direct the hooks to cause them to engage the holes formed in the sides of the ship. I will proceed to describe in detail the structure, function and manner of use of the said means or devices mentioned above as involved in my invention in the art of raising sunken vessels by buoyant force.

In the accompanying drawings showing my devices,—

Fig. 2 is a view of the air tank with the leg, the equalizer, cables and hooks attached thereto.

Fig. 3 is a view of the air tank, the equalizer in an inclined position and the cables and hooks attached thereto.

Fig. 4 is a view of the air tank, the leg, the equalizer, the cables, a hook engaging a hole in the side of the ship, and another hook engaged on the manipulating rod projecting from the working chamber, and the adjustable bar and lug on the top of the working chamber engaging the bottom thereof.

Fig. 5 is a view of the air tank, supported by the leg, the siphon and the working chamber beneath the air tank, the manipulating rod engaging the eye of the stem of the siphon.

Figure 1:
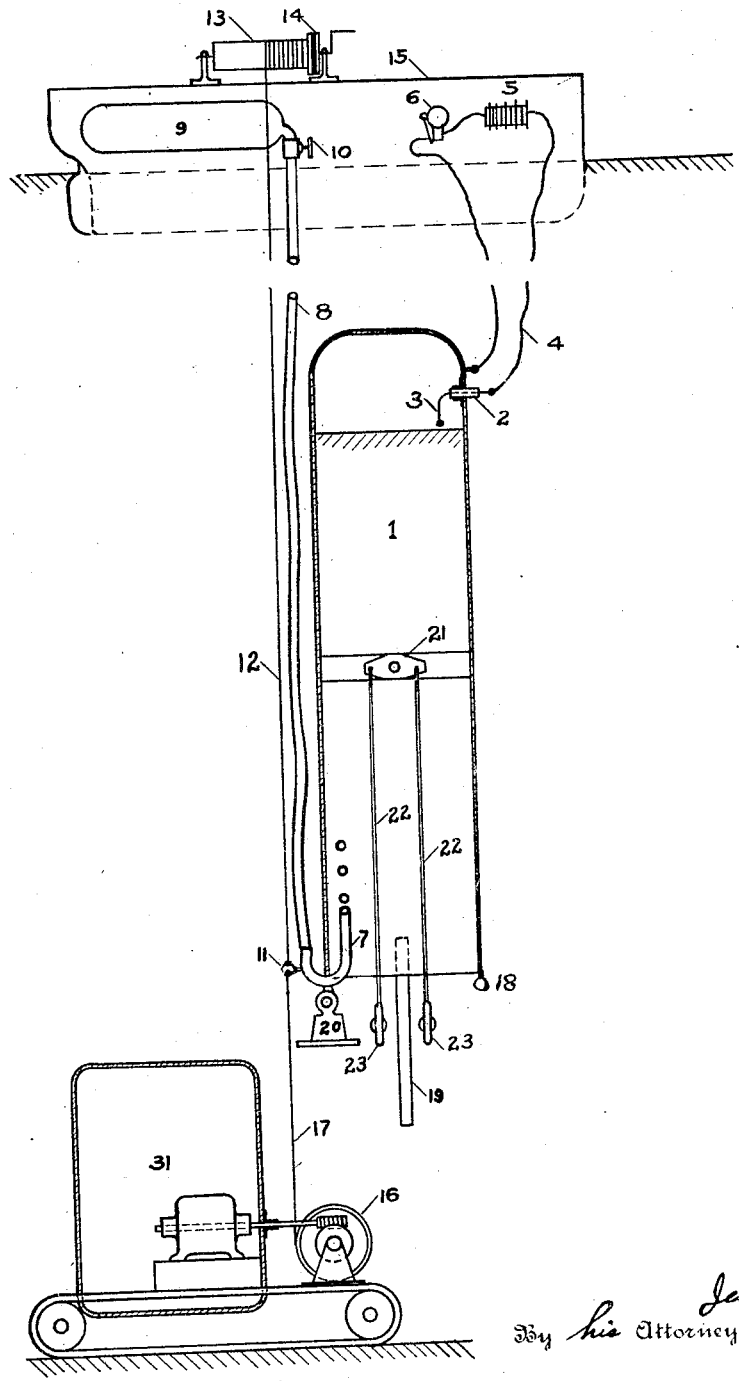
Figure 1 is a view of my air tank together with a signaling device and siphon, and working chamber with a reel or drum.

An air tank, 1, comprising a hollow cylinder closed at one end and open at the opposite end, is carried or towed to the point above the site of a sunken ship, S, which is to be raised, and the air tank is thereupon lowered into the sea and permitted to sink to the bottom thereof and rest thereon. A suitable number of tanks are distributed on the bottom of the sea around the sides of the sunken ship ready to be used to lift the ship. At or near the closed end of the air tank, I secure in the wall thereof an electric insulator, 2, through which I insert an electric conductor or terminal, 3, at a suitable level above the surface of the water in the air tank. On the opposite end of the terminal lead, 3, I attach a wire 4, and lead the same to one pole of an electric battery, 5, and from the other pole of the battery I carry a wire to one side of an indicating or signaling device, 6, which I have shown merely as a matter of convenient illustration as a bell, and from the other side of the bell I have carried a conductor wire to a terminal fixed to the wall of the air tank.

I place under the rim or bottom of the air tank a siphon, 7, with one limb of the siphon within the air tank and the other limb outside of the tank and affixed to an air pipe or tube, 8, the opposite end of which is connected to a compressed air tank, 9, the supply of air therefrom under pressure being controlled by a valve, 10. There is also secured to a ring, 11, on the siphon, one end of a cable, 12, the other end of the cable being on a winch, 13, the rotation of which in paying out the cable, 12, is suitably regulated or controlled by any proper retarding or braking device, 14. I have shown the signaling device, compressed air tank, and winch carried on a ship, 15.

The air tank, 1, is towed or carried to the site over the sunken vessel, and permitted partially to fill with water, whereupon the valve, 10 is opened and air under pressure from the compressed air tank, 9, allowed to pass through the tubing, 8, to the siphon and be discharged from the limb within the tank. The air rises to the closed end of the tank and thereby prevents the water from rising or further filling the tank, whereupon the air tank being supported by the siphon and the cable, 12, is allowed to sink a short distance in the sea under the control of the operator of the winch, 13. The size of the air tank which I contemplate using weighs substantially about fifteen (15) tons, and sufficient air is admitted into it by the siphon until the water line in the tank is lowered to the level that I desire. The air displaces a volume of water sufficient almost to balance the weight of the tank, the excess weight of the same, say, being about 1000 pounds. As the bottom of the air tank rests on the siphon, it is desirable as the operation of lowering the tank in the sea proceeds, to maintain the overbalance within about the limit spoken of above. Inasmuch as the volume of the air in the air tank is rapidly reduced as the tank descends on account of the increasing pressure of the sea water, it is necessary to force in the tank sufficient air through the siphon to hold the water line at the level predetermined and keep it practically constant, for, on the one hand, excess of air in the tank would make the tank so buoyant as to cause it to rise to the surface, whereas, on the other hand, if the volume of air is too much reduced the weight of the tank on the syphon might break it. In order constantly to indicate the water level at the line in the tank already predetermined as the tank descends, I provide means for automatically signaling or indicating to the attendant operating the air compressor the position of the water line in the air tank. The means consists of an electrically operated signaling device, 6, already described. In operation the electric circuit is completed when the water level comes into contact with the terminal, 3, to the wire 4, thus ringing the gong or bell, 6, and warning the compressor man to increase the supply of air through the siphon. As I have already stated, I have shown the signaling device, compressed air tank and winch carried on a ship, 15, Fig. 1. When it is desired to sever the connection between the tank and the signaling device, the ends or terminals of the conductor leads can be pulled out of the tank.

I contemplate that the air tank will sink to the bottom of the sea subsantially at the site desired; but if it be found that there are tidal or other currents which tend to carry the air tank to one side or away from the site, I thereupon bring into use my mobile tractor working chamber, 31, power reel or drum, 16, and cable, 17, at the point where I desire the air tank to descend. I secure the free end of the cable, 17, to the ring, 11, on the siphon, 7, and thereupon cause the drum, 16, to wind the cable, 17, on it, and thereby draw the siphon, 7, down, and thus conduct the air tank, 1, to the site desired. The free rotation of the winch, 13, being regulated or controlled by the brake, 14, its cable, 12, is virtually unwound off of it by the cable, 17, being wound on the drum, 16; the consequence is that practically a straight and taut line of cable can be obtained and maintained between the two drums, 13 and 16, and the speed, direction of descent and site of deposit of the air tank be controlled at the will of the operator. In some cases, it may be found to be desirable to attach the free end of the rope, 17, to a ring, 18, in the bottom of the tank, 1, or otherwise attach the rope to the tank in order to draw the tank down in the sea, in which event the air pressure in the tank will be regulated and controlled to cause the tank to be buoyant instead of a sinking body.

One of the outstanding features of my invention in the art of raising sunken ships is the practicability of sinking the air tanks to the bottom of the sea, thereby being enabled to use the bottom of the sea as a storage yard entirely sheltered from storms of the sea and waves. To enhance that plan, I have secured to the bottom of the air tanks, a post or leg, 19, of a suitable length with its bottom or free end resting on the bottom of the sea, the other end affixed to and supporting the tank at a sufficient elevation or height to allow overhead room for the entry beneath the bottom of the tank of a mobile working chamber as shown in Figs. 4 and 5. The post, 19, attached to the bottom of the tank allows the working chamber room to be run under the tank as I have stated, but at the same time offers no obstruction to the range of vision of the operator. I regard this plan of a post to support the air tank to afford sufficient ovehead for the working chamber as being very valuable in practice. It might be likened by analogy to providing a scaffolding or false work under a building or other structure on land to provide a working space beneath the structure.

After the air tank has been lowered in the sea with the free end of the post resting on the bottom and supporting the tank, the siphon, which I have weighted by means of an extension or base, 20, is allowed to sink below the bottom rim of the tank and thereby become disengaged or freed therefrom.

It is plain that a very great lifting force will be required and employed to lift the sunken vessel and consequently the lifting force will have to be properly distributed, but even more than that the strain of the lifting force should properly be equalized or else the vessel be subjected to serious adverse strains or stresses. To accomplish that object I have provided an equalizer, 21, for securing the hoisting ropes, 22, and hooks, 23, to the lifting tank, 1. If only one rope and one hook were used, the hull of the ship might be strained and perhaps the plates be torn apart; by using the equalizing lever, 21, two ropes and hooks can be used and the strain equally divided between them, no matter what the position of the ship may be as it is lifted or hangs suspended in the water, that is, when the bow is higher than the stern or vice versa. The pivot pin, 24, of the equalizing lever, 21, is preferably located slightly below the center of buoyancy of the air tank. This arrangement reduces the lateral thrust of the pivot against the side of the sunken ship. The shorter the rope connecting the pivot to the hook, 23, the greater is the angle and the greater is the tendency to crush in the side of the tank as it presses against the side of the ship. The pivot pin, 24, is shown journaled between a pair of steel channel bars, 25, within the tank, which have their ends welded or otherwise secured to the wall of the tank. In order to resist the side thrust, I provide a strut, 26, at right angles to the channel bars, 25, which is welded or otherwise secured to the tank at the line of contact between the tank and the ship. Secured from the opposite end of the equalizing lever, 21, are hoisting cables or ropes, 22, at the free end of which are secured the hooks, 23, which are designed to hook into holes, 27, formed in the side of the sunken ship, S. I have formed an eye, 28, in the hook, which is designed to receive the end, 29, of a crank rod, 30, in the working chamber, 31, carried on an endless belt tractor, 32. By mounting the end, 29, of the crank rod, 30, on the crank, 33, I secure a radius and range of effective operation of the bar only circumscribed by the circle described by the end, 29, by axially turning the bar, 30, by means of the handle, 34. On the top of the working chamber I have pivotally mounted an arm, 35, carrying on its free end a lug or finger, 36, adjustable to be raised and lowered from and to the level of the top of the working chamber by means of the hand wheel or screw, 37. When the hole, 27, has been formed in the side of the sunken ship, say for instance, by my apparatus disclosed in my applications for patents therefor, Serial No. 340,540, filed November 25, 1919, and No. 347,764, filed December 27, 1919, and the air tank, 1, has been lowered in the sea to rest on the post, 19, on the bottom of the sea the operator in the working chamber on the endless belt tractor turns the hand wheel, 37, and adjusts the arm, 35, a sufficient height to engage the bottom of the air tank and lift the latter with its post, 19, from off of the bottom of the sea, and therefore cause the tractor to move the working chamber farther beneath the air tank until the lug, 36, engages the bottom of the tank, and then the tractor will move the air tank to the side of the ship at the site of the hole, 27. In the meanwhile, having caused the end, 29, of the rod, 30, to thread the eye, 28, of the hook, 23, and by moving the rod, 30, longitudinally of its axis, I force the hook into the hole, 27, in the side of the ship.

The next step in order is to cause the working chamber to pick up the siphon, 7, from off of the bottom of the sea and carry it within the circumference of the open bottom of the air tank to discharge air from the tank, as I have already explained. The siphon rests on its base, 20, on the bottom of the sea, after it has been freed from the rim or open bottom of the air tank, 1. In the stem, 38, of the siphon I have formed an eye, 39, adapted to receive the end, 29, of the crank rod, 30, in the working chamber, 31. By turning the crank rod, 30, axially by means of the handle, 34, the end, 29, of the rod will serve to raise the siphon from off of the bottom of the sea by the fact that the end, 29, engages the eye, 39; whereupon the tractor is moved to carry the siphon beneath the bottom of the air tank, 1, the lug, 36, having been, in the meantime, lowered so as to be free from contact with or striking the bottom of the tank, as shown in Fig. 5. Upon opening the valve, 10, of the compressed air tank, 9, air under pressure will be conducted by the tubing, 8, to the siphon, 7, and discharged therefrom under the air tank, 1, and the air will rise through the water in the tank to the air in the closed end of the tank, and, when all is ready, the buoyant force of a sufficient number of air tanks attached to the sides of the ship will serve to raise her from the bottom of the sea. And at this point in my description, I desire to direct attention to the advantages of my air tank in the art of raising sunken vessels, as compared with what is generally known in the prior state of the art as a pontoon, which usually is a single hollow cylinder or some type of air inflatable bag, of a length and other dimensions calculated to be adequate to raise by its buoyancy the sunken vessel. It has been proposed to drop a row of hooks from a pontoon to engage holes formed in the sides of the ship, and to cause the pontoon as a single body to rise and raise the ship. It is unnecessary to point out the difficulties and inadequacies of attempting to handle such a type of buoyant device, let alone cause it successfully to lift a sunken ship. My air tank is a comparatively small hollow cylinder, easy to construct and handle, and readily distributed along the sides of the ship, raising the same evenly and without strain.

While I have described in more or less detail, the structure, function and mode of operation of my devices or means for raising sunken vessels and the effect of the operation of those devices in raising the sunken vessel, it is obvious, however, that I do not desire or intend to limit myself to the exact form of the devices that I have shown.

Having described my invention, what I desire to secure by Letters Patent is:

1. In the art of raising sunken vessels by buoyant force, the combination of an air tank, closed at one end and adapted to sink to the bottom of the sea at the site of a sunken vessel, and an electrically operated signaling device connected to the tank, adapted to indicate the water level and the volume of air in the tank in the operation of sinking the same to the bottom of the sea.

2. In the art of raising sunken vessels by buoyant force, an apparatus, comprising the combination of a drum, a brake to control the same mounted on a ship, a cable wound on the drum, a U-shaped siphon secured to the free end of the cable and adapted to receive the open bottom of a cylindrical hollow air tank with the other end sealed, an endless belt tractor adapted to be moved on the bottom of the sea at the site of the sunken vessel, and a drum and working chamber carried thereon, from which the drum is controlled, a cable wound on the drum with its free end secured to the siphon, the whole constituting a means to let down into the sea under control the air tank and support and guide it to the place desired at the side of the sunken vessel.

3. In the art of raising sunken vessels by buoyant force, an air tank, consisting of a hollow cylinder sealed at one end and open at the other end, an equalizer bar pivoted in the tank, cables which have their ends secured to the opposite ends of the equalizer bar and hooks carried by the cables, adapted to be engaged in holes formed in the side of the sunken vessel, to enable the air tank to raise the vessel by its buoyant force.

4. In the art of raising sunken vessels by buoyant force, an air tank, comprising a hollow chamber sealed at one end and open at the other end, and a post or leg projecting from the lower end of the cylinder to support the same at a proper distance to allow overhead room for the entry beneath the bottom of the cylinder of an endless belt tractor carrying a working chamber thereon.

5. In the art of raising sunken vessels by buoyant force, an air tank, comprising a hollow chamber sealed at one end and open at the other end, an equalizer bar pivoted in the cylinder, cables secured to the opposite ends of the bar, hooks carried by the free ends of the cables adapted to hook into holes formed in the side of the sunken ship, and a post or leg projecting a suitable distance from the bottom of the cylinder or tank to support it at the proper height to permit an endless belt tractor carrying a working chamber to pass under the bottom of the tank, and engage the hooks to cause them to engage the holes in the side of the ship.

6. In the art of raising sunken vessels by buoyant force, the combination of an air tank and a double-limbed or U-shaped siphon, adapted to engage the bottom of a hollow air tank, and one limb adapted to be connected to a source of supply of compressed air and the other limb to discharge air for the air tank, the limbs of the siphon being mounted on the stem and base adapted to support the siphon on the bottom of the sea, the stem having a hole therein adapted to receive the end of a rod projecting from the working chamber carried on the endless belt tractor, to lift the siphon and carry it to any point where it is desired at the site of the sunken vessel.

7. In the art of raising sunken vessels by buoyant force, an apparatus comprising an endless belt tractor, a working chamber thereon, means carried by the tractor adapted to be used under the rim of the open end of a buoyant air tank supported on the sea bed whereby the tank can be elevated so as to clear the bottom of the sea and thus be transported along the sea bed to the side of the sunken ship.

8. In the art of raising sunken vessels by buoyant force, an apparatus comprising an endless belt tractor, a working chamber thereon, an adjustable bar on the top of the chamber, with an upright lug projecting therefrom, and means to adjust the bar to cause it to engage under the air tank and lift the same, and the lug to engage the tank and move it along as the tractor moves.

In testimony whereof, I have signed my name to this specification.

JESSE W. RENO.